United States Patent [19]

Heiser

[11] 4,056,965
[45] Nov. 8, 1977

[54] PRESS SYSTEM OR THE LIKE

[76] Inventor: Elmer F. Heiser, 8313 Pin Oak, Parma, Ohio 44130

[21] Appl. No.: 628,886

[22] Filed: Nov. 5, 1975

[51] Int. Cl.$^2$ ............................................. B21D 24/02
[52] U.S. Cl. ..................................... 72/351; 137/843; 251/5; 267/119
[58] Field of Search ................. 72/351, 350, 396, 465, 72/453; 267/119; 137/525; 251/5

[56] References Cited

U.S. PATENT DOCUMENTS

| 1,926,012 | 9/1933 | Ferris | 72/351 |
| 2,294,451 | 9/1942 | Ernst | 72/351 |
| 2,989,019 | 6/1961 | Van Sciver | 267/119 |
| 3,092,144 | 6/1963 | Green | 251/5 |
| 3,290,034 | 12/1966 | Williamson | 267/119 |
| 3,522,926 | 8/1970 | Bryant | 251/5 |
| 3,937,440 | 2/1976 | MacGregor | 251/5 |

FOREIGN PATENT DOCUMENTS

33,109  8/1972  Japan ................................... 267/119

*Primary Examiner*—C.W. Lanham
*Assistant Examiner*—Gene P. Crosby

[57] ABSTRACT

A press system includes an improved valve assembly which is utilized to control a flow of hydraulic fluid from a die cylinder chamber. This valve assembly includes a pair of rigid foraminous members and a resiliently deflectable valve member. The valve member is movable between a closed position extending across and sealing openings in the foraminous members and an open position in which the valve member is spaced apart from the openings to enable hydraulic fluid from the die cylinder chamber to flow through the openings in the foraminous members. The valve member is urged toward the closed position by a compressible fluid, such as nitrogen gas. When the hydraulic fluid pressure in the die cylinder chamber exceeds a predetermined pressure, the valve member is moved from the closed position to the open position against the influence of the biasing pressure applied against the valve member by the compressible fluid. In one embodiment of the invention a pair of valve assemblies are associated with the press to relieve the hydraulic fluid pressure in the die cylinder chamber at a relatively high pressure during an initial portion of an operating cycle of the press and to provide a relatively low hydraulic fluid pressure in the die cylinder chamber during a final portion of the operating cycle. In another embodiment of the invention the hydraulic fluid pressure at which the die cylinder chamber is relieved is varied as a function of extent of relative movement between the piston and cylinder which form the die cylinder chamber.

30 Claims, 10 Drawing Figures

PRESS SYSTEM OR THE LIKE

BACKGROUND OF THE INVENTION

This invention relates generally to a press system or the like and more specifically to a press system having improved valve assembly for controlling the fluid pressure in a cylinder chamber. The valve assembly may advantageously be utilized in systems other than a press system.

The metal stamping industry has utilized press systems similar to those disclosed in U.S. Pat. Nos. 3,202,411 and 3,636,749 to Heiser to form products of many different configurations. These presses have included a pressure pad which is supported by a die cylinder. During operation of the press, a ram is moved downwardly and the pressure pad is driven against the die cylinder. When a predetermined fluid pressure has been obtained in a die cylinder chamber, a pressure relief valve is actuated to relieve the hydraulic fluid pressure. Most of the pressure relief valves in general use depend upon the movement of mechanical parts to effect their operation between a closed position and an open position in which the fluid pressure is exhausted from the die cylinder chamber.

It is believed that the mechanical parts of these relief valves just do not move as fast as demanded by the operating characteristics of the press system. It is believed that this lack of response is due to the inertia of the various parts of the relief valve assembly. Thus, upon closing of the press there is an instantaneous surge of hydraulic fluid pressure in the die cylinder chamber. The surge results in a pressure shock peak occurs before the movable parts in a mechanical relief valve assembly can be actuated to relieve the peak pressure. Similarly, an immediate response is necessary to compensate for a rapidly diminishing or fading flow which may occur after the initial pressure surge.

In a prior art press system, the flow of hydraulic fluid from the cylinder chamber and the maintenance of the desired system pressure is dependent upon mechanical movement of a valve element. This valve element must effects a precise variation in an orifice to maintain the desired pressure in the die cylinder. Due to manufacturing tolerances, wear of mechanical parts and inertia effects, the mechanical valve member may not vary the orifice size in the precise manner required for optimum press operation. For these and other reasons, the pressure requirements for a given die may never be obtained during operation of the prior art press system. This has resulted in an experimental procedure in setting up and operating of the prior art press system.

SUMMARY OF THE PRESENT INVENTION

An improved press system includes a valve assembly which is utilized to quickly and accurately control the flow of hydraulic fluid from a die cylinder chamber. This is accomplished by moving a valve member against the influence of biasing fluid pressure. Immediately before the hydraulic fluid pressure in the die cylinder chamber has reached a predetermined relief pressure, the biasing fluid pressure against the valve member is just barely effective to hold it in the closed position. As the hydraulic fluid pressure in the die cylinder chamber reaches the predetermined relief pressure, the hydraulic fluid pressure against the valve member is effective to move it quickly and easily away from the closed position against the influence of the biasing fluid pressure. The valve member may advantageously be formed of a resiliently flexible sheet material which will respond to a very small change in the hydraulic fluid pressure in the die cylinder chamber so as to quickly and predictably relieve the fluid pressure. In addition, this resiliently flexible valve member moves with small variations in the fluid pressure in the cylinder chamber to accurately modulate the flow of hydraulic fluid from the die cylinder chamber and maintain the desired hydraulic fluid pressure in the die cylinder chamber.

During the forming of parts having certain shapes, it may be desirable to maintain a relatively high fluid pressure in the die cylinder chamber during an initial portion of a forming operation and then to quickly change to a relatively low hydraulic fluid pressure in the die cylinder chamber. In accordance with one of the features of the present invention, this change in fluid pressure is obtained by utilizing a pair of valve assemblies. The hydraulic fluid pressure in the die cylinder chamber is directed to one of the pair of assemblies which opens under the influence of a relatively high fluid pressure during the initial portion of the forming operation. During a subsequent portion of the forming operation, the hydraulic fluid pressure in the die cylinder chamber is directed to a second valve assembly which opens under the influence of a relatively low fluid pressure to thereby effect a reduction in the hydraulic fluid pressure in the die cylinder chamber.

During the operation of the press to form other objects, it is contemplated that it may be desirable to continuously vary the hydraulic fluid pressure in the die cylinder chamber during the operating stroke of the press. In accordance with one of the features of the present invention, an apparatus is provided to vary the fluid pressure biasing force against the valve member as a function of the extent of relative movement between the piston and cylinder of the die cylinder assembly. Of course, as the fluid pressure biasing force against the valve member is varied, the hydraulic fluid pressure in the die cylinder is varied during the operating stroke of the press.

Accordingly, it is an object of this invention to provide a new and improved press system or the like having a valve assembly which is utilized to control the hydraulic fluid pressure in a cylinder chamber and wherein the valve assembly includes a valve member which is urged toward a closed position under the influence of fluid pressure.

Another object of the invention is to provide a new and improved system as set forth in the next preceding paragraph and wherein the valve member is formed of a resiliently flexible sheet material which is moved between a closed position sealing a plurality of openings and an open position under the influence of a fluid pressure differential across the valve member.

Another object of this invention is to provide a new and improved press system having a valve assembly which is connected in fluid communication with a cylinder chamber to maintain a first fluid pressure in the cylinder chamber during one portion of an operating cycle and a second fluid pressure in the cylinder chamber during another portion of the operating cycle.

Another object of the invention is to provide a new and improved press system in which a control arrangement is provided to direct hydraulic fluid from a die cylinder chamber to a first one of a pair of valve assemblies during a first portion of an operating cycle of the press and to direct hydraulic fluid from the die cylinder chamber to a second valve assembly during another portion of the operating cycle to thereby effect a variation in the fluid pressure in the die cylinder chamber during the operating cycle.

Another object of this invention is to provide a new and improved valve assembly having a valve member which is resiliently flexed, against the influence of a fluid pressure bias, from a closed position blocking fluid flow through a plurality of openings to an open position in which fluid can flow through the openings.

BRIEF DESCRIPTION OF THE DRAWINGS

The foregoing and other objects and features of the present invention will become more apparent upon a consideration of the following description taken in connection with the accompanying drawings wherein.

DESCRIPTION OF SPECIFIC PREFERRED EMBODIMENTS OF THE INVENTION

Figures 1, 2, 3:
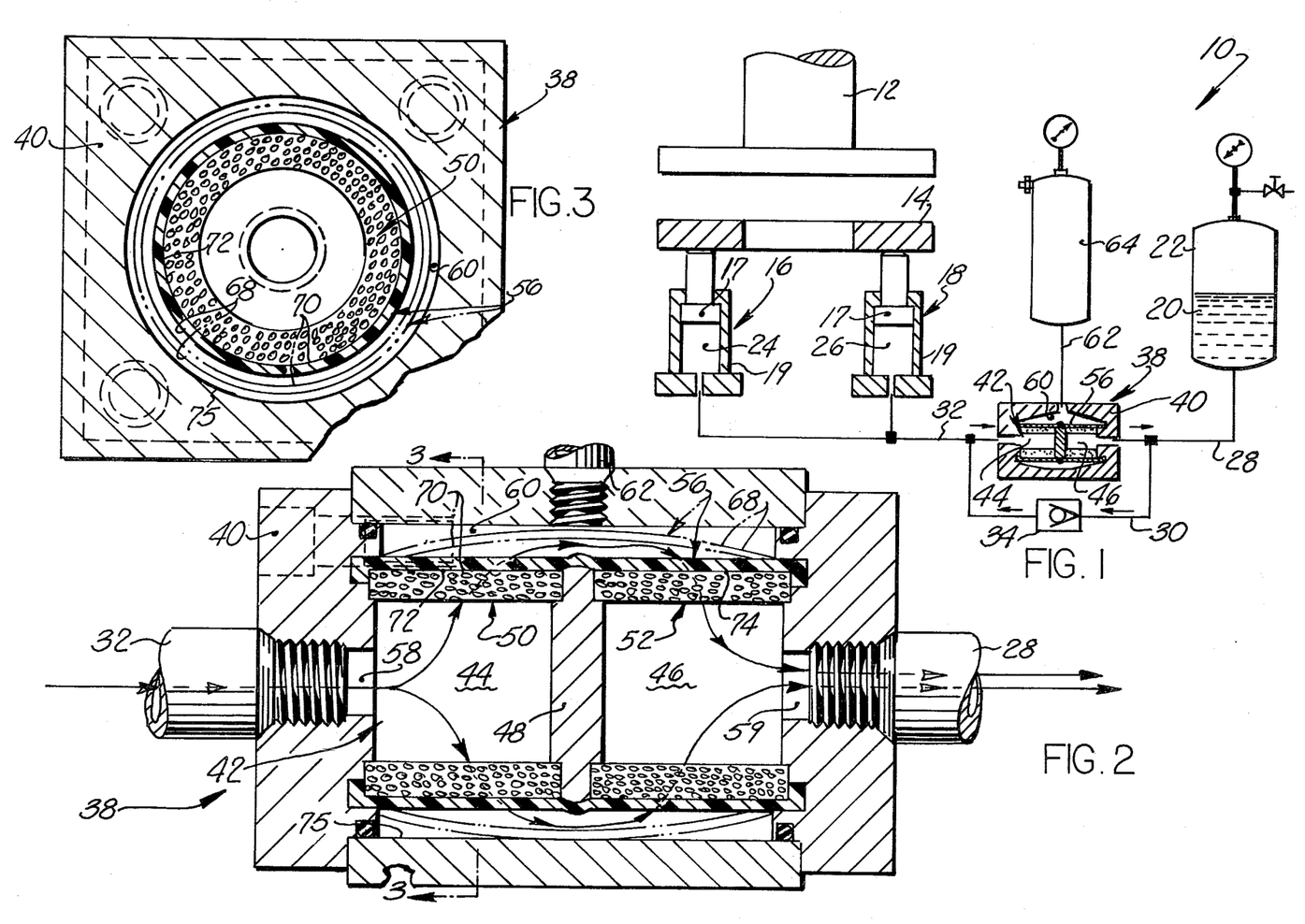
FIG. 1 is a schematic illustration of a press system constructed in accordance with the present invention.
FIG. 2 is an enlarged sectional view of an improved valve assembly utilized in the press system of FIG. 1.
FIG. 3 is a sectional view, taken generally along the line 3—3 of FIG. 2, illustrating the relationship between a fixed valve member and a resilient flexible valve member which is movable between a closed position illustrated in solid lines and an open position illustrated in dashed line.

An improved press system 10 is illustrated schematically in FIG. 1. The press system 10 includes a ram 12 which is moved downwardly (as viewed in FIG. 1) against a pressure pad 14 to form a metal object in a well known manner. As the ram 12 moves downwardly against the pressure pad 14, the pressure pad is driven against the die cylinder assemblies 16 and 18. The die cylinder assemblies include pistons 17 which cooperate with cylinders 19 to form die cylinder chambers 24 and 26 which are initially filled with hydraulic fluid 20 from a supply tank 22. The hydraulic fluid 20 is substantially incompressible and is maintained at a predetermined initial fluid pressure sufficient to operate the die cylinder assemblies 16 and 18 to the extended condition. To enable die cylinder chambers 24 and 26 to be initially filled with the hydraulic fluid 20 at the predetermined pressure, the die cylinder chambers are connected in fluid communication with the supply tank 22 by conduits 28, 30 and 32. A check valve 34 is provided to prevent a back flow of fluid from the die cylinder chambers 24 and 26 to the supply tank 22 through the conduit 30 during operation of the press system.

In accordance with a feature of the present invention, an improved valve assembly 38 is utilized to control the fluid pressure in the die cylinder chambers 24 and 26 during movement of the ram 12 through an operating stroke. The valve assembly 38 includes a housing 40 in which a valve chamber 42 is divided into two cylindrical sections 44 and 46 (FIG. 2) by a circular wall 48. A pair of stationary or fixed valve elements 50 and 52 have a cylindrical configuration and are formed of sintered metal and have surfaces which define a large number of small openings through which hydraulic fluid can flow. A generally cylindrical valve member 56 is formed of a flexible polymeric sheet material that is movable between a closed position (illustrated in solid lines of FIGS. 2 and 3) in which it blocks fluid flow through the foraminous fixed valve elements 50 and 52 and an open position (illustrated in dashed lines in FIGS. 2 and 3) in which the movable valve member is spaced apart from the fixed valve elements 50 and 52 so that hydraulic fluid can flow from an inlet 58, through the openings in the fixed valve elements to an outlet 59 in the manner illustrated schematically by the arrows in FIG. 2. After the hydraulic fluid has passed through the members 50 and 52, it is returned to the supply tank 22 through the conduit 28.

During operation of the press system 10, a predetermined fluid pressure is maintained in the die cylinder chambers 24 and 26 and the valve member 56 is maintained in the closed position until this predetermined fluid pressure is exceeded. In accordance with one feature of the present invention, the valve member 56 is urged toward the closed position under the influence of a predetermined mass of a resiliently compressible fluid such as nitrogen gas. When the predetermined hydraulic fluid pressure is exceeded in the die cylinder chambers 24 and 26, the hydraulic fluid pressure is effective to move the valve member 56 from the closed position to the open position against the influence of the biasing pressure applied against the valve member by the mass of compressible fluid.

A cylindrical variable volume chamber 60 in the housing 40 is connected in fluid communication with a supply tank 64 by a conduit 62 (see FIG. 1). The supply tank 64 contains a compressible fluid under pressure. The compressible fluid pressure against the radially outer cylindrical major side surface 68 (FIGS. 2 and 3) of the movable valve member 56 presses a radially inner cylindrical major side surface 70 of the valve member against cylindrical outer surfaces 72 and 74 of the fixed valve members 50 and 52. When the movable valve member 56 is pressed against the outer surfaces 72 and 74 of the fixed valve members 50 and 52, the many openings through the sintered metal fixed valve members are blocked to thereby block the flow of hydraulic fluid between the valve chamber sections 44 and 46.

When the hydraulic fluid pressure in the die cylinder chambers 24 and 26 and the valve chamber section 44 exceeds a predetermined relief pressure, the hydraulic fluid pressure against the inner major side surface 70 of the flexible valve member 56 is effective to resiliently deflect the valve member radially outwardly from the closed position shown in solid lines in FIGS. 2 and 3 to the open position shown in dashed lines in FIGS. 2 and 3. As the valve member 56 moves outwardly from the closed position to the opened position, the size of the chamber 60 is reduced and the mass of compressible fluid in the chamber 60 and tank 64 is, to some extent, compressed with a resulting increase in the fluid pressure. The predetermined relief pressure at which the valve member 56 moves from the closed position to the open position can be easily adjusted for different press operations by merely varying the fluid pressure in the tank 64.

Although it is preferred to utilize nitrogen gas as the compressible fluid, it is contemplated that other gases could be utilized. In fact, it is even contemplated that the compressible fluid could take the form of a liquid in which gas is entrained to provide compressibility. It should be noted that the valve member 56 is formed of a suitable polymeric material which is impervious to both the compressible fluid in the chamber 60 and the hydraulic fluid in the valve chamber 44 so that there is no fluid communication through the valve member between the chamber 60 and the chamber section 44.

When the valve member 56 has been resiliently deflected to the open position, hydraulic fluid is exhausted from the die cylinder chambers 24 and 26 through the conduit 32 to the valve chamber section 44 in the manner illustrated schematically by arrows in FIG. 2. The hydraulic fluid then flows radially outwardly through the porous cylindrical walls of the fixed valve member 50 into the annular space between the outer surface 72 of the fixed valve member 50 and the major inner side surface 70 of the outwardly deflected valve member 56. The hydraulic fluid then flows axially along a path extending around the rigid circular wall 48 separating the valve chamber section 44 from the valve chamber section 46. The hydraulic fluid then flows radially inwardly through the many openings in the fixed valve member 52 and into the valve chamber section 46. The fluid is then conducted back to the supply tank 22 through the conduit 28.

Immediately before the valve member 56 moves from the closed position to the open position, the hydraulic fluid pressure in the chamber 44 will be closely approaching the fluid pressure in the chamber 60. At this time, the valve member 56 is held in the closed position under the influence of only its own natural resilience and the relatively small pressure differential between the chamber 44 and the chamber 60. When the hydraulic fluid pressure in the die cylinder chambers 24 and 26 exceeds the predetermined relief pressure, the valve member 56 can be readily moved by the hydraulic fluid pressure in the chamber 44 from the closed position to the opened position. This enables the valve member 56 to be quickly moved from the closed position to the open position within minimum delay.

In addition to providing for rapid movement between the opened and closed positions, the valve member 56 also provides an accurate fluid flow modulating action. Thus, if the fluid pressure in the die cylinder chamber 24 and 26 exceeds the pressure in the chamber 60 by only a small amount, the valve member 56 will be deflected only part way toward the fully opened position illustrated in dashed lines in FIG. 2 and will quickly close as soon as the excess pressure in the die cylinder chambers 24 and 26 has been relieved. Of course, if there is a relatively large surge in the pressure in the die cylinder chambers 24 and 26 due to impacting of the ram 12 against a piece supported by the pressure pad 14 or other causes, the surge in pressure in the section 44 of the valve chamber 42 will cause the valve member 56 to quickly move to the fully open position. It should be noted that the housing 40 has a cylindrical inner surface 75 which limits the radially outward movement of the valve member 56 to prevent it from being ruptured by a sudden surge in fluid pressure. Due to the natural resilience of the valve member and the effect of the compressible gas in the chamber 60, any shock loading on the system due to the sudden surge in fluid pressure will be dampened or absorbed by the valve assembly 38.

In the embodiment of the valve assembly 38 illustrated in FIG. 2 the valve member 56 cooperates with the cylindrical outer surfaces 72 and 74 of the porous sintered metal members 50 and 52. In the embodiment of the valve assembly illustrated in FIGS. 4 and 5, the valve member cooperates with cylindrical inner surfaces of the porous metal members. Since the embodiment of the invention illustrated in FIG. 4 is similar to the embodiment illustrated in FIG. 1, similar numerals will be utilized to identify similar components, the suffix letter "a" being associated with the numerals of FIG. 4 to avoid confusion.

The valve assembly 38a includes a housing 40a which is connected in fluid communication with die cylinder chambers, similar to die chambers 24 and 26 of FIG. 1, by a conduit 32a. The conduit 28a conducts hydraulic fluid from the valve assembly 38a to a supply tank, similar to the supply tank 22 of FIG. 1. In addition, a conduit 62a connects the housing 40a in fluid communication with a source of compressible fluid under pressure, that is with a supply tank similar to the supply tank 64 of FIG. 1.

Figure 4:
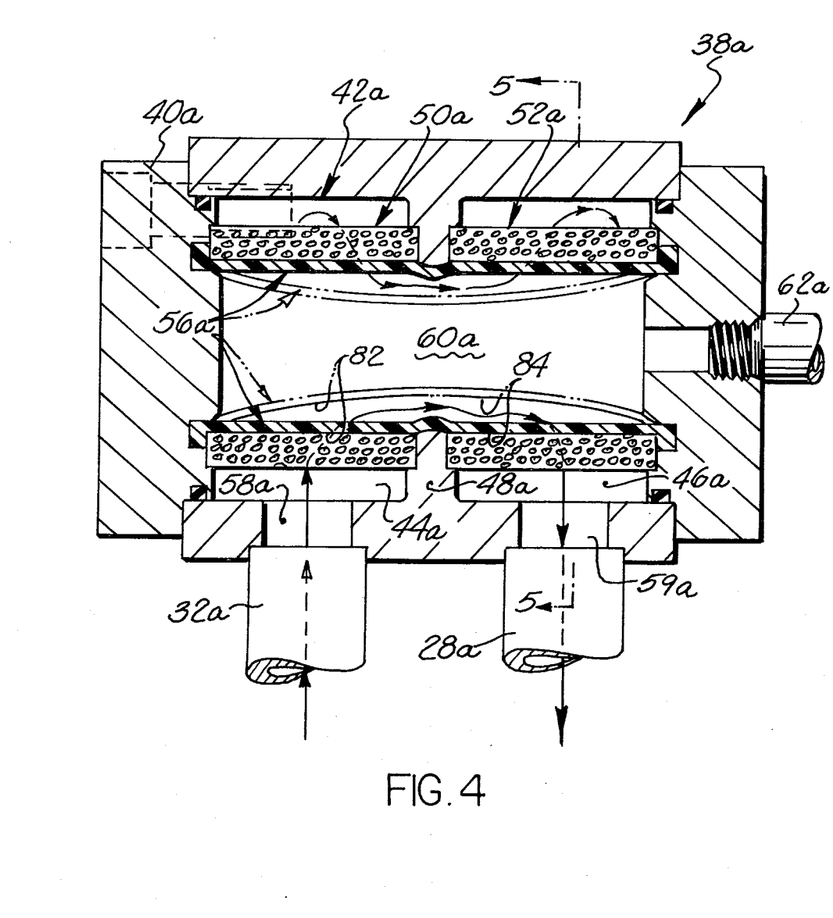
FIG. 4 is a sectional view illustrating the construction of a second embodiment of the valve assembly.
Figure 5:
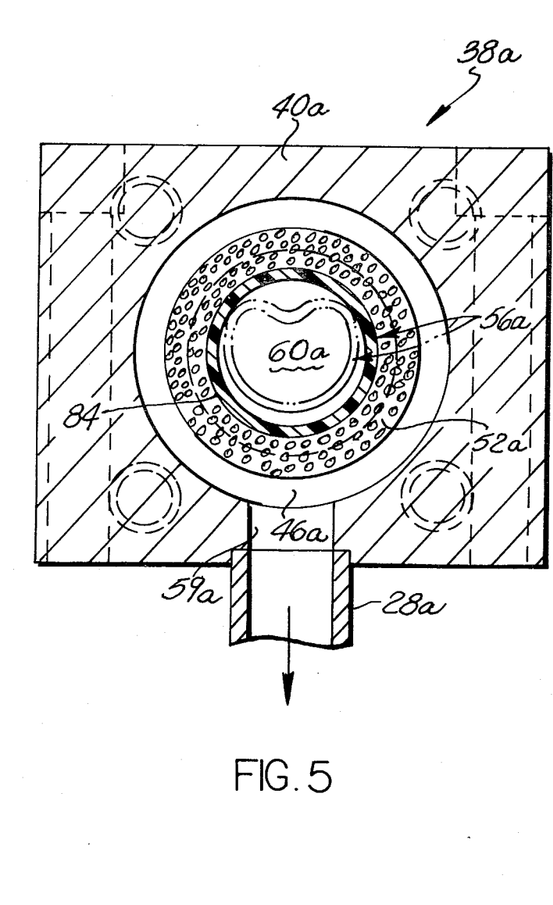
FIG. 5 is a sectional view, taken generally along the line 5—5 of FIG. 4, illustrating a flexible valve member in a closed position in solid lines and an open position in dashed lines.

In the embodiment of the invention illustrated in FIG. 4 a cylindrical resiliently deflectable valve member 56a is movable from the closed position illustrated in solid lines in FIGS. 4 and 5 to an open position illustrated in dashed lines in FIGS. 4 and 5. When the flexible valve member 56a is in the closed position it is in abutting sealing engagement with cylindrical inner surfaces 82 and 84 of cylindrical foraminous members 50a and 52a which are disposed in a coaxial relationship in a valve chamber 42a having a pair of annular sections 44a and 46a. The two valve chamber sections 44a and 46a are separated by a rigid annular wall 48a.

During operation of the press associated with the valve assembly 38a, hydraulic fluid pressure is conducted from a die cylinder chamber through an inlet port 58a to the valve chamber section 44a. When the hydraulic fluid pressure in the die cylinder chamber is slightly less than the maximum desired operating pressure, the pressure of the compressible gas in the cylindrical variable volume chamber 60a is effective to hold the valve member 56a in sealing engagement with the cylindrical inner surfaces 82 and 84 of the annular fixed valve members 50a and 52a. As the fluid pressure in the die cylinder chamber increases and exceeds a predetermined relief pressure, the valve member 56a is resiliently deflected radially inwardly from the closed position illustrated in solid lines in FIG. 4 to the open position illustrated in dashed lines. As this occurs, the compressible fluid in the variable volume chamber 60a is compressed.

After the valve member 56a has moved to the open position, the hydraulic fluid can flow radially inwardly through the many openings in the porous sintered metal member 58a in the manner illustrated by the arrows in FIG. 4. The fluid can then flow axially along the outer surface of the valve member 56a to the inner surface 84 of the porous sintered metal member 52a. The hydraulic fluid then flows radially outwardly through the porous sintered metal member 52a into the chamber section 46a. From the annular chamber section 46a, the hydraulic fluid flows through an outler 59a to the conduit 28a leading to a supply tank containing hydraulic fluid under pressure. Of course, as hydraulic fluid is exhausted from the die cylinder chambers, the die cylinder piston moves inwardly and decreases the volume of the die cylinder chamber.

Figure 6:
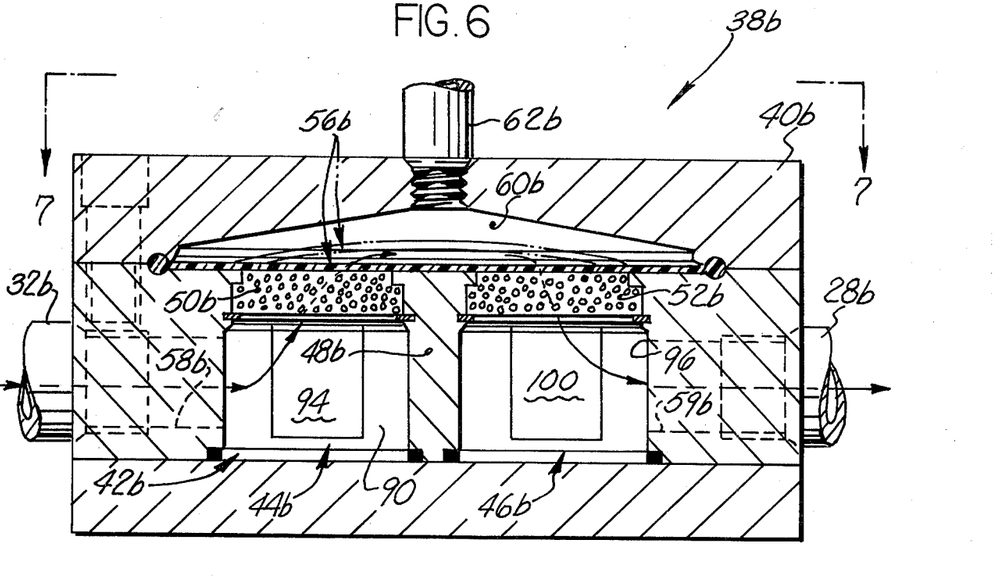
FIG. 6 is a sectional view of a third embodiment of the valve assembly.
Figure 7:
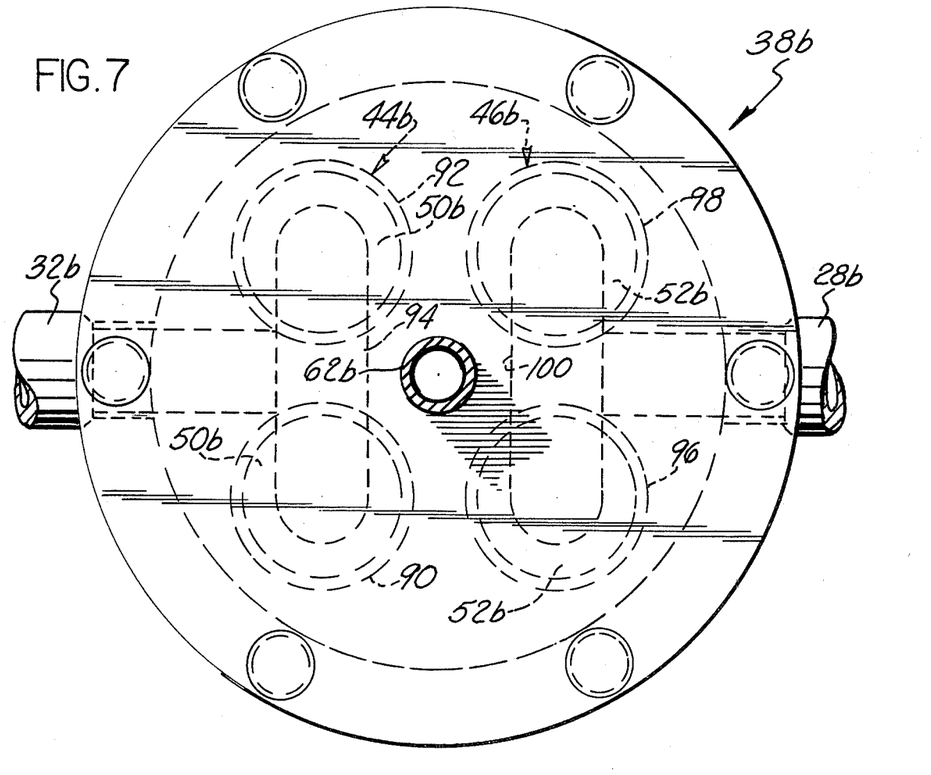
FIG. 7 is a top plan view, taken generally along the line 7—7 of FIG. 6, further illustrating the construction of the valve assembly.

In the embodiments of the valve assembly illustrated in FIGS. 2 through 5, generally cylindrical resiliently deflectable valve members made out of polymeric sheet material have been utilized in association with generally cylindrical sintered metal members through which the hydraulic fluid flows when the movable valve member is in an opened position. It is contemplated that it may be desirable to form the sintered porous members and the valve member with a configuration other than the illustrated cylindrical configuration. In the embodiment of the invention illustrated in FIGS. 6 and 7 the porous sintered members have a circular configuration and are associated with a flat circular disc shaped valve member. Since the embodiment of the invention illustrated in FIGS. 6 and 7 is generally similar to the embodiments of the invention illustrated in FIGS. 2 through 5, similar numerals will be utilized to designate similar components, the suffix letter "b" being associated with FIGS. 6 and 7 to avoid confusion.

A valve assembly 38b includes a housing 40b having a valve chamber 42b which is divided into a pair of sections 44b and 46b. The valve chamber section 44b is connected with a die cylinder chamber by a fluid conduit 32b while the valve chamber 46b is connected with a tank holding hydraulic fluid under pressure by a conduit 28b. The valve chamber section 44b has two cylindrical parts 90 and 92 which are connected by a cross passage 94 having a generally rectangular configuration (see FIG. 7). Similarly, the valve chamber section 46b includes two cylindrical parts 96 and 98 which are interconnected by a rectangular cross passage 100.

Circular foraminous sintered metal fixed valve members 50b are associated with the cylindrical parts 90 and 92 of the valve chamber section 44b. Similarly, a pair of circular foraminous sintered metal fixed valve members 52b are associated with the cylindrical parts 96 and 98 of the outlet section 46b of the valve chamber. A circular resiliently deflectable disc shaped valve member 56b is movable between a closed position (illustrated in solid lines in FIG. 7) blocking fluid flow through the porous metal parts 50b and 52b and an open position (illustrated in dashed lines in FIG. 6) in which hydraulic fluid under pressure can flow upwardly through the many openings in the porous sintered metal parts 50b around a rigid central wall 48b. The hydraulic fluid then flows downwardly through the many openings in the porous sintered metal parts 52b into the outlet section 46b of the valve chamber 42b. This hydraulic fluid can then flow through the conduit 28b to a suitable supply tank.

The valve member 56b is urged toward the closed position under the influence of a compressible fluid under pressure which is disposed in a variable volume chamber 60b which has a generally conical configuration. The variable volume chamber 60b is connected with a supply tank, similar to the supply tank 64 of FIG. 1, by a conduit 62b. It should be appreciated although the construction of the valve assembly 38b differs somewhat from the construction of the valve assemblies 38 and 38a, they all function in substantially the same manner when connected in a press system, similar to the press system 10 of FIG. 1. Although it is preferred to utilize porous sintered metal parts as fixed valve members in association with the resiliently deflectable valve members, it is contemplated that the sintered metal parts could be replaced by other elements which have a plurality of openings, for example a perforated metal stamping, a woven screen or an assembly of parts.

Figures 8, 9, 10:
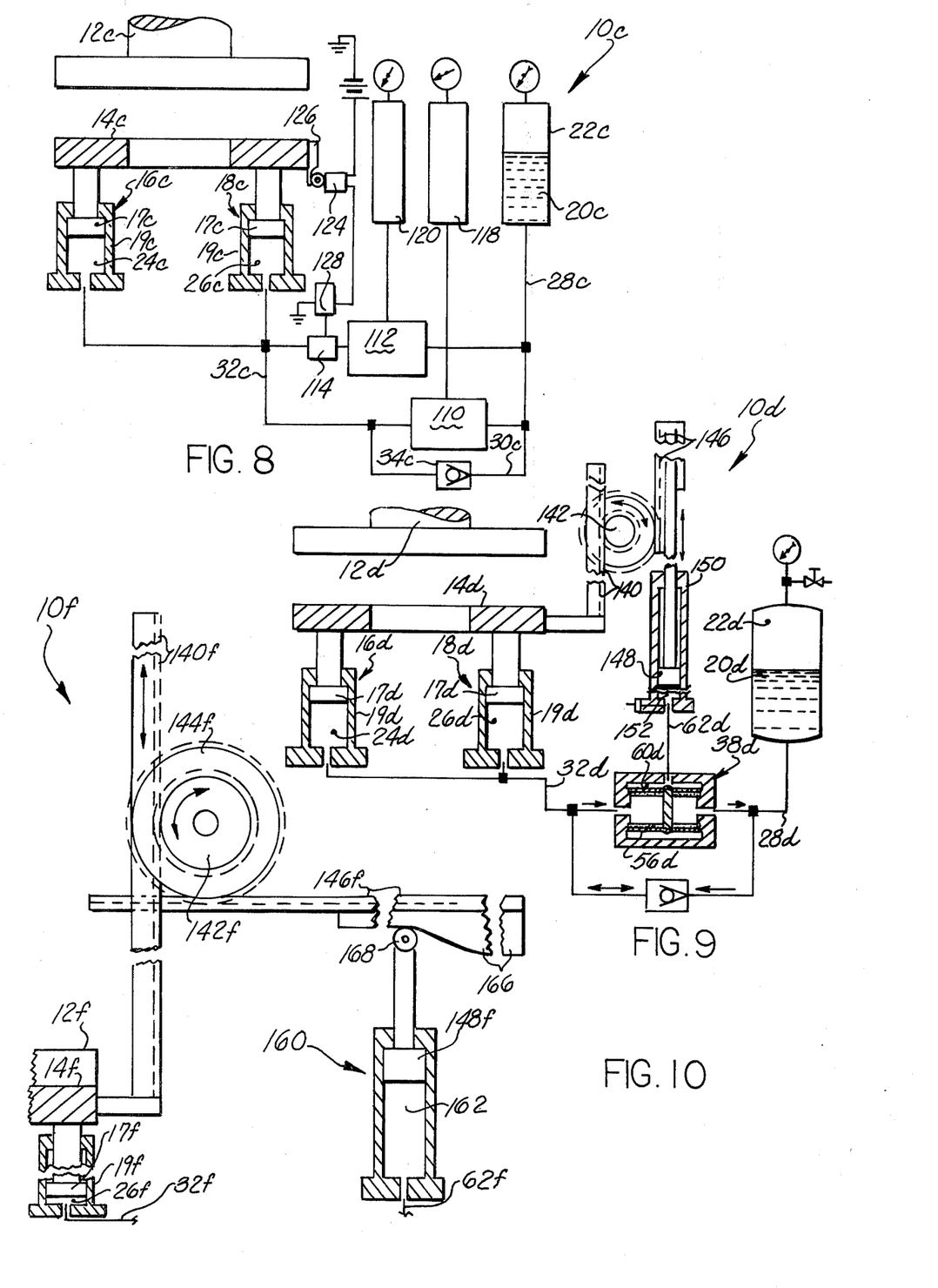
FIG. 8 is a schematic illustration, generally similar to FIG. 1, of a press system in which a pair of valve assemblies are utilized to vary the fluid pressure in a die cylinder chamber during an operating cycle of the press system.
FIG. 9 is a schematic illustration, generally similar to FIG. 8, of a press system in which the fluid pressure in a die cylinder chamber is continuously varied during an operating cycle of the press system.
FIG. 10 is a fragmentary schematic illustration of a press system in which a relatively high die cylinder pressure is maintained during initial portion of an operating cycle and a relatively low die cylinder pressure is maintained during a subsequent portion of the operating cycle.

In the embodiment of the invention illustrated in FIG. 1 the press system 10 is utilized with a single valve assembly 38 which is effective to relieve the hydraulic fluid pressure in the die chambers 24 and 26 when the fluid pressure exceeds a predetermined value. It is contemplated that during certain forming operations it may be desirable to maintain a relatively high hydraulic fluid pressure in the die cylinder chambers during initial portion of the forming operation and thereafter effect a reduction in the fluid pressure to somewhat lower value. A press system for accomplishing this and constructed in accordance with the present invention is illustrated in FIG. 8. Since the construction and mode of operation of the present system of FIG. 8 is generally similar to the construction and mode of operation of the press system of FIG. 1, similar numerals will be utilized to identify similar components, the suffix letter "c" being associated with the components of FIG. 8 in order to avoid confusion. The press system 10c includes a ram 12c which is movable relative to a pressure pad 14c which is supported by a pair of die cylinder assemblies 16c and 18c. Hydraulic fluid is supplied to die cylinder chambers 24c and 26c from a supply tank 22c which is connected with the die cylinder chambers 24c and 26c by conduits 28c, 30c and 32c. A suitable check valve 34c is provided to prevent a back flow of hydraulic fluid from the die cylinder chambers 24c and 26c during operation of the press system 10c.

In accordance with one feature of this embodiment of the invention, a pair of valve assemblies 110 and 112 are utilized to control the fluid pressure in the die cylinder chambers 24c and 26c. The valve assembly 110 is effective to relieve the fluid pressure in the die cylinder chambers 24c and 26c when a relatively high predetermined pressure is obtained during an initial portion of an operating cycle of the system 10c. After the initial portion of the operating cycle, a solenoid operated valve 114 is actuated and the die cylinder chambers 24c and 26c are connected in fluid communication with the second valve assembly 112. This valve assembly is effective to relieve the fluid pressure in the die cylinder chambers 24c and 26c at a relatively low pressure so that there is substantially less resistance to movement of the pistons 17c relative to the cylinders 19c during the second portion of the operating cycle.

The valve assemblies 110 and 112 both have the same construction as the valve assembly 38 of FIGS. 2 and 3. However, the valve assembly 110 is connected with a tank 118 containing a predetermined mass of a compressible fluid at a relatively high pressure while the valve assembly 112 is connected with a tank 120 containing a predetermined mass of a compressible fluid at a relatively low pressure. The compressible fluid from the relatively high pressure tank 118 is conducted to a variable volume chamber, similar to the chamber 60 in the valve assembly 38, to bias a valve member, similar to the valve member 56, toward the closed position with a relatively high pressure. Therefore, a relatively high hydraulic fluid pressure must be present in the die cylinder chambers 24c and 26c to effect movement of the valve member in the valve assembly 110 against the influence of the relatively high pressure exerted by the compressible fluid.

The valve assembly 112 is biased toward the closed position under the influence of the relatively low fluid pressure in the tank 120. Therefore, the valve member in the valve assembly 112 can be moved from the closed position to the open position against the influence of the fluid pressure when there is a relatively low hydraulic fluid pressure in the die cylinder chambers 24c and 26c.

During an initial portion of the cycle of operation of the press 10c, the valve 114 is closed and the hydraulic fluid pressure in the die cylinder chambers 24c and 26c is relieved only when this pressure exceeds the predetermined pressure necessary to effect movement of the valve member in the valve assembly 110 to the open position against the relatively high fluid pressure conducted to the valve assembly 110 from the supply tank 118. As the pressure pad 14c moves downwardly and the pistons 17c of the die cylinder assemblies 16c and 18c move downwardly relative to the cylinders 19c, a limit switch 124 is actuated by a cam 126 connected with the pressure pad 14c. Actuation of the limit switch 124 completes a circuit to energize a solenoid 128 which actuates the valve 114 to an open condition. Upon opening of the valve 114, the die cylinder chambers 24c and 26c are connected in fluid communication with the valve chamber in the valve assembly 112. Since the valve member in the valve assembly 112 is urged to the closed position under the influence of the relatively low fluid pressure in the tank 120, the relatively high hydraulic fluid pressure in the die cylinder cavities 24c and 26c is effective to actuate the valve member to the open position and to relieve the fluid pressure in the die cylinder chamber. Of course, the particular die cylinder pressures at which the valve assemblies 110 and 112 are actuated to the open condition can be varied by varying the pressures in the tanks 118 and 120.

In the embodiment of the invention illustrated in FIG. 8, the hydraulic fluid pressure in the die cylinder chambers 24c and 26c is changed from a relatively high fluid pressure to a relatively low fluid pressure once during the operating cycle of the press system 10. It is contemplated that, under certain circumstances, it may be desirable to continuously vary the fluid pressure after the ram has become effective to apply force against the pressure pad. Accordingly, in the embodiment of the invention illustrated in FIG. 9, a press system includes a piston and cylinder assembly which is actuated as the pressure pad is depressed in order to vary the fluid pressure in the die cylinder chambers as a function of the extent of movement of the pressure pad. Since the embodiment of the invention illustrated in FIG. 9 is generally similar to the embodiment of the invention illustrated in FIG. 1, similar numerals will be applied to designate similar components, the suffix letter "d" being associated with the elements of FIG. 9 in order to avoid confusion.

The press system 10d includes a ram 12d which is movable relatively to a pressure pad 14d supported by a pair of die cylinder assemblies 16d and 18d. A valve assembly 38d having the same construction as the valve assembly 38 of FIG. 2 is connected in fluid communication with die cylinder chambers 24d and 26d by conduit 32d. The valve assembly 38d is connected in fluid communication with a storage tank 22d containing pressurized hydraulic fluid 20d by a conduit 28d. Upon downward movement of the pressure pad 14d and movement of the pistons 17d relative to the cylinders 19d, a rack gear 140 connected with the pressure pad 14d is moved through a distance corresponding to the extent of movement of the pistons 17d. This causes rotation of a relatively small pinion gear 142. The pinion gear 142 is fixedly connected with a second pinion gear 144 which is disposed in meshing engagement with a rack gear 146. The rack gear 146 is connected with a piston 148 which is slidably disposed in a cylinder 150. A variable volume chamber 152 of the cylinder 150 is connected in fluid communication with a chamber 60d in the valve assembly 38d by a conduit 62d.

During the initial portion of an operating cycle the piston 148 is in the lower portion of the cylinder 150 at this time the volume of the chamber 152 is small and a relatively high pressure is applied to the predetermined mass of compressible fluid in the chamber. This relatively high fluid pressure is communicated to the chamber 60d by the conduit 62d. Therefore, when the piston 148 is near the bottom of the cylinder 150, a relatively high fluid pressure is applied by the compressible fluid against a valve member 56d to urge the valve member to the closed position.

During operation of the press system 10d the platen 14d is forced downwardly by the ram 12d and fluid flows from the die cylinder chamber 24d and 26d through the valve assembly 38d back to the storage tank 22d. As the pressure pad 14d moves downward, the pistons 17d move downward and the rack gear 140 rotates the pinion gear 142 which in turn rotates the pinion 144. Rotation of the pinion gear 144 moves the rack gear 146 upwardly to thereby move the piston 148 upwardly in the cylinder 150. As the piston 148 moves upwardly, the volume of the chamber 152 is expanded with a resulting decrease in the pressure which is exerted by the constant mass of compressible fluid against the valve member 56d. This results in a pressure modulating action by the valve member 60d and a reduction in the hydraulic fluid pressure in the die cylinder cavities 24d and 26d. Although the rack gears 140 and 146 have been illustrated as having a continuous linear array of teeth so that the piston 148 is continuously moved upwardly as the pistons 17 move downwardly, it is contemplated that an intermittent linear array of teeth could be provided on either the rack gear 140 or the rack gear 146 so that the piston 148 would be intermittently moved relative to the cylinder 150. Of course, if this was done a suitable one-way clutch arrangement would have to be provided to prevent reverse rotation of the pinion gears 142 and 144.

It is contemplated that it may be desirable to vary the hydraulic pressure in the die cylinder chambers 24d and 26d with as a function of pressure pad movement in a manner differently than is obtained with the gears 140, 142, 144 and 146 of FIG. 9. Accordingly, in the embodiment of the invention illustrated in FIG. 10, a cam is provided to effect movement of a piston to gradually vary the volume of a chamber containing a constant mass of a compressible fluid. Since the embodiment of the invention illustrated in FIG. 10 is generally similar to the embodiment of the invention illustrated in FIG. 9, similar numerals will be utilized to designate similar components, the suffix letter "f" being associated with FIG. 10 to avoid confusion.

The press system 10f includes a pressure pad 14f which is urged downwardly by a ram 12f during an operating cycle of the press system. As this occurs, piston 17f moves downwardly and hydraulic fluid is expelled from a die cylinder chamber 26f. The die cylinder chamber 26f is connected with a valve assembly (not shown) having the same construction as the valve assembly 38 of FIG. 1 by a conduit 32f. This valve assembly is also connected with a piston and cylinder assembly 160 having a cylinder chamber 162 containing a compressible fluid. The cylinder chamber 162 is conducted in fluid communication with the valve assembly by a conduit 62f. The conduit 62f is connected in fluid communication with a chamber, corresponding to the chamber 60 of FIG. 2, in the valve assembly. Therefore, the compressible fluid is utilized to urge a valve member toward the closed position in the same manner as previously described in connection with FIGS. 1–3.

In accordance with a feature of the present invention, the fluid pressure applied against the movable valve member in the valve assembly is gradually varied in accordance with the configuration of a cam 166 which is connected with a rack gear 146f. Upon movement of the cam 166 toward the left, as viewed in FIG. 10, a cam followed 168 causes a piston 148f to move downwardly and increase the pressure in the variable volume chamber 162. Increasing the pressure in the chamber 162 increases the fluid pressure urging the valve member toward the closed position. It should be noted that the pressure pad 14f is shown in a fully retracted position and the piston 148f is at the upper end of its stroke. Therefore, there is a minimum fluid pressure applied to the valve member urging it toward its closed position at the end of the operating cycle of the press system. It is contemplated that the cam 166 could have many different configurations to vary the fluid pressure in any desired manner during a press operating cycle.

The cam 166 is moved relative to the cam follower 168 by a gearing arrangement which is similar to the gearing arrangement utilized in the embodiment of the invention illustrated in FIG. 9. Specifically, a rack gear 140f is connected with the pressure pad 14f. The rack gear 140f is disposed in meshing engagement with a pinion gear 142f which is fixedly connected with a second pinion gear 144f. The pinion gear 144f is disposed in meshing engagement with the rack gear 146f.

In view of the foregoing description, it can be seen that an improved press system 10 includes a valve assembly 38 which is utilized to quickly and accurately control the flow of hydraulic fluid 20 from die cylinder chambers 24 and 26. This is accomplished by moving a valve member 56 against the influence of biasing fluid pressure in a chamber 60. Immediately before the hydraulic fluid pressure in the die cylinder chambers 24 and 26 has reached a predetermined relief pressure, the biasing fluid pressure against the valve member 56 is just barely effective to hold it in the closed position. As the hydraulic fluid pressure in the die cylinder chambers 24 and 26 reaches the predetermined relief pressure, the hydraulic fluid pressure against the valve member 56 is effective to move it quickly and easily away from the closed position against the influence of the biasing fluid pressure. The valve member 56 may advantageously be formed of a resiliently flexible sheet material which will respond to a very small change in the hydraulic fluid pressure in the die cylinder chambers 24 and 26 so as to quickly and predictably relieve the fluid pressure. In addition, this resiliently flexible valve member 56 moves with small variations in the fluid pressure in the cylinder chambers to accurately modulate the flow of hydraulic fluid from the die cylinder chambers and maintain the desired hydraulic fluid pressure in the die cylinder chambers.

During the forming of parts having certain shapes, it may be desirable to main a relatively high fluid pressure in the die cylinder chambers 24 and 26 during an initial portion of a forming operation and then to quickly change to a relatively low hydraulic fluid pressure in the die cylinder chambers. In accordance with one of the features of the present invention, this change in fluid pressure is obtained by utilizing a pair of valve assemblies 110 and 112. The hydraulic fluid pressure in the die cylinder chambers is directed to the valve of assembly 110 which opens under the influence of a relatively high fluid pressure during the initial portion of the forming operation. During a subsequent portion of the forming operation, the hydraulic fluid pressure in the die cylinder chambers is directed to the second valve assembly 112 which opens under the influence of a relatively low fluid pressure to thereby effect a reduction in the hydraulic fluid pressure in the die cylinder chamber.

During the operation of the press to form other objects, it is contemplated that it may be desirable to continuously vary the hydraulic fluid pressure in the die cylinder chamber during the operating stroke of the press. In accordance with one of the features of the present invention, gearing 140, 142, 144 and 146 is provided to vary the volume of a chamber 152 and the fluid pressure biasing force against the movable valve member as a function of the extent of relative movement between the piston and cylinder of the die cylinder assembly. Of course, as the fluid pressure biasing force against the valve member is varied, the hydraulic fluid pressure in the die cylinder chamber is varied during the operating stroke of the press.

Having described specific preferred embodiments of the invention, the following is claimed:

1. A press system or the like comprising hydraulic cylinder means for applying force to a member, said hydraulic cylinder means including a piston and cylinder which are relatively movable through an operating stroke to vary the volume of a variable volume cylinder chamber defined by said piston and cylinder, means for supplying hydraulic fluid under pressure to and conducting hydraulic fluid from said cylinder chamber to effect relative movement between said piston and cylinder and a variation in the volume of said variable volume cylinder chamber, valve means connected in fluid communication with said variable volume cylinder chamber for maintaining at least a first fluid pressure in said variable volume cylinder chamber during a first portion of an operating stroke and for maintaining at least a second fluid pressure in said variable volume cylinder chamber during a second portion of an operating stroke, said valve means including a housing which at least partially defines a valve chamber having a hydraulic fluid inlet connected in fluid communication with said cylinder chamber and a hydraulic fluid outlet, a valve member disposed in said housing and movable between a closed position blocking hydraulic fluid flow from said hydraulic fluid inlet to said hydraulic fluid outlet to thereby block hydraulic fluid flow from said cylinder chamber and an open position enabling hydraulic fluid to flow from said hydraulic fluid inlet to said hydraulic fluid outlet to thereby enable hydraulic fluid to flow from said cylinder chamber, pressure chamber means for holding a fluid under pressure, said valve member being urged toward the closed position under the influence of the fluid pressure in said pressure chamber means, said valve member being movable from the closed position to the open position under the influence of the pressure of hydraulic fluid in said valve chamber and against the influence of the fluid pressure in said pressure chamber means, and means for varying the fluid pressure in said pressure chamber from one fluid pressure during said first portion of an operating stroke to another fluid pressure during said second portion of an operating stroke to vary the force urging said valve member toward the closed position and the magnitude of the hydraulic fluid pressure required in said valve chamber to effect movement of said valve member from said closed position to said open position.

2. A system as set forth in claim 1 wherein said fluid in said pressure chamber is a compressible fluid, said means for varying the fluid pressure in said pressure chamber including means for varying the volume of said pressure chamber.

3. A system as set forth in claim 1 wherein said valve means further includes a rigid member disposed in said valve chamber and at least partially defining a plurality of openings through which hydraulic fluid must pass in flowing from said hydraulic fluid inlet to said hydraulic fluid outlet, said valve member being formed of a resiliently flexible material having a major side surface, said major side surface of said valve member being disposed in abutting engagement with said rigid member and extending across said plurality of openings to block fluid flow through said openings when said valve member is in the closed position, said valve member being resiliently deflected from the closed position to the open position in which at least a portion of said major side surface is spaced apart from said rigid member to enable hydraulic fluid to flow through said plurality of openings.

4. A system as set forth in claim 1 wherein said means for varying the fluid pressure includes means for gradually varying the fluid pressure in said pressure chamber from said one fluid pressure to said other fluid pressure during an operating stroke.

5. A press system or the like comprising hydraulic cylinder means for applying force to a member, said hydraulic cylinder means including a relatively movable piston and cylinder which cooperate to define a variable volume cylinder chamber, means for supplying hydraulic fluid under pressure to said cylinder chamber to effect relative movement between said piston and cylinder and an increase in the volume of said variable volume cylinder chamber, conduit means connected in fluid communication with said variable volume cylinder chamber for conducting hydraulic fluid from said variable cylinder chamber to effect a decrease in the volume of said variable volume cylinder chamber, valve means connected in fluid communication with said conduit means for at least partially controlling the flow of hydraulic fluid from said variable volume cylinder chamber, said valve means including housing means for at least partially defining first and second valve chambers, each of said valve chambers having a hydraulic fluid inlet connected in fluid communication with said cylinder chamber by said conduit means and a hydraulic fluid outlet, a first valve member disposed in said housing means and movable between a closed position and an open position, said first valve member in said closed position being effective to block hydraulic fluid flow between said hydraulic fluid inlet to said first valve chamber and said hydraulic fluid outlet for said first valve chamber to block hydraulic fluid flow from said cylinder chamber through said first valve chamber, said first valve member in said open position being effective to enable hydraulic fluid from said cylinder chamber to flow between said hydraulic fluid inlet to said first valve chamber and said hydraulic fluid outlet for said first valve chamber to enable hydraulic fluid to flow from said cylinder chamber through said first valve chamber first variable volume chamber means for holding fluid under pressure, said first valve member being urged toward the closed position under the influence of the fluid pressure in said first variable volume chamber means, said first valve member being movable from the closed position to the open position under the influence of the pressure of hydraulic fluid in said first valve chamber and against the influence of the fluid pressure in said first variable volume chamber means when the hydraulic fluid pressure in said cylinder chamber exceeds a first predetermined pressure, said first valve member being effective upon movement from the closed position to the open position to effect a reduction in the volume of said first variable volume chamber means, a second valve member disposed in said housing means and movable between a closed position and an open position, said second valve member in said closed position being effective to block hydraulic fluid flow between said hydrauic fluid inlet to said second valve chamber and said hydraulic fluid outlet for said second valve chamber to block hydraulic fluid flow from said cylinder chamber through said second valve chamber, said second valve member in said open position being effective to enable hydraulic fluid from said cylinder chamber to flow between said hydraulic fluid inlet to said second valve chamber and said hydraulic fluid outlet for said second valve chamber to enable hydraulic fluid to flow from said cylinder chamber through said second valve chamber, second variable volume chamber means for holding fluid under pressure, said second valve member being urged toward the closed position under the influence of the fluid pressure in said second variable volume chamber means, said second valve member being movable from the closed position to the open position under the influence of the pressure of hydraulic fluid in said second valve chamber and against the influence of the fluid pressure in said second variable volume chamber means when the hydraulic fluid pressure in said cylinder chamber exceeds a second predetermined pressure, said second valve member being effective upon movement from the closed position to the open position to effect a reduction in the volume of said second variable volume chamber means, and control means for blocking fluid flow from said cylinder chamber to said second valve chamber during one portion of the relative movement between said piston and cylinder to prevent relieving of the fluid pressure in said cylinder chamber by a flow of hydraulic fluid through said second valve chamber, said control means being effective to enable fluid to flow from said cylinder chamber to said second valve chamber during another portion of the relative movement between said piston and cylinder to enable the fluid pressure in said cylinder chamber to be at least partially relieved by a flow of hydraulic fluid through said second valve chamber.

6. A system as set forth in claim 5 wherein said first variable volume chamber means holds a predetermined mass of a compressible fluid which is compressed from a first volume to a second volume which is smaller than said first volume upon a reduction in the volume of said first variable volume chamber means.

7. A system as set forth in claim 6 wherein said second variable volume chamber means holds a predetermined mass of a compressible fluid which is compressed from a third volume to a fourth volume upon a reduction in the volume of said second variable volume chamber means.

8. A press system or the like comprising hydraulic cylinder means for applying force to a member, said hydraulic cylinder means including a relatively movable piston and cyliner which cooperate to define a variable volume cylinder chamber, means for supplying hydraulic fluid under pressure to said cylinder chamber to effect relative movement between said piston and cylinder and an increase in the volume of said variable volume cylinder chamber, conduit means connected in fluid communication with said variable volume cylinder chamber for conducting hydraulic fluid from said variable cylinder chamber to effect a decrease in the volume of said variable volume cylinder chamber, valve means connected in fluid communication with said conduit means for at least partially controlling the flow of hydraulic fluid from said variable volume cylinder chamber, said valve means including a housing which at least partially defines a valve chamber having a hydraulic fluid inlet connected in fluid communication with said cylinder chamber by said conduit means and a hydraulic fluid outlet, a valve member disposed in said housing and movable between a closed position blocking hydraulic fluid flow from said hydraulic fluid inlet to said hydraulic fluid outlet to thereby block hydraulic fluid flow from said cylinder chamber and an open position enabling hydraulic fluid to flow from said hydraulic fluid inlet to said hydraulic fluid outlet to thereby enable hydraulic fluid to flow from said cylinder chamber, variable volume chamber means for holding fluid under pressure, said valve member being urged toward the closed position under the influence of the fluid pressure in said variable volume chamber means, said valve member being movable from the closed position to the open position under the influence of the pressure of hydraulic fluid in said valve chamber and against the influence of the fluid pressure in said variable volume chamber means when the hydraulic fluid pressure in said cylinder chamber exceeds a predetermined pressure to effect at least partial relieving of the hydraulic fluid pressure in said cylinder chamber, said valve member being effective upon movement from the closed position to the open position to effect a reduction in the volume of said variable volume chamber means, and means for varying the fluid pressure in said variable volume chamber means to vary the force urging said valve member toward the closed position and the hydraulic fluid pressure required in said valve and cylinder chambers to effect movement of said valve member from the closed position to the open position, said means for varying the fluid pressure in said variable volume chamber means includes means for varying the fluid pressure in said variable volume chamber means during relative movement between said piston and cylinder and as a function of the extent of relative movement between said piston and cylinder.

9. A system as set forth in claim 8 wherein said valve means further includes a rigid member disposed in said valve chamber and at least partially defining a plurality of openings through which hydraulic fluid must pass in flowing from said hydraulic fluid inlet to said hydraulic fluid outlet, said valve member being formed of a resiliently flexible material having a major side surface, said major side surface of said valve member being disposed in abutting engagement with said rigid member and extending across said plurality of openings to block fluid flow through said openings when said valve member is in the closed position, said valve member being resiliently deflected from the closed position to the open position in which at least a portion of said major side surface is spaced apart from said rigid member to enable hydraulic fluid to flow through said plurality of openings.

10. A system as set forth in claim 8 wherein said variable volume chamber means holds a predetermined mass of a compressible fluid under pressure, said means for varying the fluid pressure in said variable volume chamber means including means for varying the volume of said variable volume chamber means to vary the extent to which the predetermined mass of compressible fluid is compressed.

11. A system as set forth in claim 8 wherein said variable volume chamber means holds a predetermined mass of a compressible fluid under pressure, said valve member being effective to compress the predetermined mass of compressible fluid from a first volume to a second volume upon movement of said valve member from the closed position to the open position.

12. A system as set forth in claim 8 wherein said valve member is an imperforate flexible sheet member formed of a material which is impervious to the hydraulic fluid, said sheet member having a first major side surface which cooperates with said housing to define said valve chamber and a second major side surface which cooperates with said housing to at least partially define said variable volume chamber means, said sheet member being effective upon movement from said closed position to said open position to expand said valve chamber and contract said variable volume chamber means.

13. A system as set forth in claim 12 wherein said variable volume chamber means holds a predetermined mass of a compressible fluid under pressure, said sheet member being effective upon contraction of said variable volume chamber means to compress the predetermined mass of fluid in said variable volume chamber means from a first volume to a second volume which is smaller than said first volume.

14. A system as set forth in claim 12 wherein said valve means further includes surface means for defining a plurality of openings through which the hydraulic fluid must pass in flowing from said hydraulic fluid inlet to said hydraulic fluid outlet, said first major side surface being disposed in sealing engagement with said surface means to block flow of hydraulic fluid through said openings when said sheet member is in said closed position.

15. A system as set forth in claim 14 wherein said sheet member has a generally cylindrical configuration, said first major side surface being disposed on a radially inner side of said sheet member.

16. A system as set forth in claim 14 wherein said sheet member has a generally cylindrical configuration, said first major side surface being disposed on a radially outer side of said sheet member.

17. A system as set forth in claim 14 wherein said sheet member has a circular disc shaped configuration.

18. A system as set forth in claim 14 wherein said surface means has a generally cylindrical configuration, said first major side surface of said sheet member having a generally cylindrical configuration corresponding to the cylindrical configuration of surface means.

19. A system as set forth in claim 8 wherein said valve means further includes first surface means disposed in said valve chamber for defining a first plurality of openings through which the hydraulic fluid must pass in a first direction when flowing from said hydraulic fluid inlet to said hydraulic fluid outlet, second surface means disposed in said valve chamber and spaced apart from said first surface means for defining a second plurality of openings through which the hydraulic fluid must pass in a second direction opposite to said first direction when flowing from said hydraulic fluid inlet to said hydraulic fluid outlet, and wall means disposed in said valve chamber for blocking hydraulic fluid flow from said hydraulic fluid inlet to said hydraulic fluid outlet along a path other than one which extends through said first plurality of openings in said first direction and through said second plurality of openings in said second direction.

20. A system as set forth in claim 19 wherein said valve member is disposed in sealing engagement with said first and second surface means and is effective to block fluid flow through said first and second plurality of openings when said valve member is in said closed position.

21. A system as set forth in claim 19 wherein said first and second surface means have a generally cylindrical configuration, said first direction of fluid flow through said first plurality of openings being in a radially outwardly direction, said second direction of fluid flow through said second plurality of openings being in a radially inward direction.

22. A system as set forth in clam 21 wherein said valve member has a generally cylindrical configuration and is disposed in sealing engagement with radially outer portions of said first and second surface means when said valve member is in the closed position.

23. A system as set forth in claim 19 wherein said first and second surface means have a generally cylindrical configuration, said first direction of fluid flow through said first plurality of openings being in a radially inward direction, said second direction of fluid flow through said second plurality of openings being in a radially outward direction.

24. A system as set forth in claim 23 wherein said valve member has a generally cylindrical configuration and is disposed in sealing engagement with radially inner portions of said first and second surface means when said valve member is in the closed position.

25. A press system or the like comprising hydraulic cylinder means for applying force to a member, said hydraulic cylinder means including a piston and cylinder which are relatively movable through an operating stroke to vary the volume of a variable volume cylinder chamber defined by said piston and cylinder, means for supplying hydraulic fluid under pressure to and conducting hydraulic fluid from said cylinder chamber to effect relative movement between said piston and cylinder and a variation in the volume of said variable volume cylinder chamber, valve means connected in fluid communication with said variable volume cylinder chamber for maintaining at least a first fluid pressure in said variable volume cylinder chamber during a first portion of an operating stroke and for maintaining at least a second fluid pressure in said variable volume cylinder chamber during a second portion of an operating stroke, said valve means including a housing which at least partially defines a valve chamber having a hydraulic fluid inlet connected in fluid communication with said cylinder chamber and a hydraulic fluid outlet, a valve member disposed in said housing and movable between a closed position blocking hydraulic fluid flow from said hydraulic fluid inlet to said hydraulic fluid outlet to thereby block hydraulic fluid flow from said cylinder chamber and an open position enabling hydraulic fluid to flow from said hydraulic fluid inlet to said hydraulic fluid outlet to thereby enable hydraulic fluid to flow from said cylinder chamber, pressure chamber means for holding a fluid under pressure, said valve member being urged toward the closed position under the influence of the fluid pressure in said pressure chamber means, said valve member being movable from the closed position to the open position under the influence of the pressure of hydraulic fluid in said valve chamber and against the influence of the fluid pressure in said pressure chamber means, and means for varying the fluid pressure in said pressure chamber from one fluid pressure during said first portion of an operating stroke to another fluid pressure during said second portion of an operating stroke to vary the force urging said valve member toward the closed position and the magnitude of the hydraulic fluid pressure required in said valve chamber to effect movement of said valve member from said closed position to said open position, said means for varying the fluid pressure in said pressure chamber including means for varying the fluid pressure as a function of the extent of relative movement between said piston and cylinder.

26. A press system or the like comprising hydraulic cylinder means for applying force to a member, said hydraulic cylinder means including a piston and cylinder which are relatively movable through an operating stroke to vary the volume of a variable volume cylinder chamber defined by said piston and cylinder, means for supplying hydraulic fluid under pressure to and conducting hydraulic fluid from said cylinder chamber to effect relative movement between said piston and cylinder and a variation in the volume of said variable volume cylinder chamber, valve means connected in fluid communication with said variable volume cylinder chamber for maintaining at least a first fluid pressure in said variable volume cylinder chamber during a first portion of an operating stroke and for maintaining at least a second fluid pressure in said variable volume cylinder chamber during a second portion of an operating stroke, said valve means including a housing which at least partially defines a valve chamber having a hydraulic fluid inlet connected in fluid communication with said cylinder chamber and a hydraulic fluid outlet, a valve member disposed in said housing and movable between a closed position blocking hydraulic fluid flow from said hydraulic fluid inlet to said hydraulic fluid outlet to thereby block hydraulic fluid flow from said cylinder chamber and an open position enabling hydraulic fluid to flow from said hydraulic fluid inlet to said hydraulic fluid outlet to thereby enable hydraulic fluid to flow from said cylinder chamber, pressure chamber means for holding a fluid under pressure, said valve member being urged toward the closed position under the influence of the fluid pressure in said pressure chamber means, said valve member being movable from the closed position to the open position under the influence of the pressure of hydraulic fluid in said valve chamber and against the influence of the fluid pressure in said pressure chamber means, and means for varying the fluid pressure in said pressure chamber from one fluid pressure during said first portion of an operating stroke to another fluid pressure during said second portion of an operating stroke to vary the force urging said valve member toward the closed position and the magnitude of the hydraulic fluid pressure required in said valve chamber to effect movement of said valve member from said closed position to said open position, said means for varying the fluid pressure includes means for gradually varying the fluid pressure in said pressure chamber from said one fluid pressure to said other fluid pressure during an operating stroke, said means for gradually varying the fluid pressure includes a cam member which is moved upon relative movement between said piston and cylinder and follower means for effecting a change in the fluid pressure in said pressure chamber in response to movement of said cam member.

27. A press system or the like comprising hydraulic cylinder means for applying force to a member, said hydraulic cylinder means including a relatively movable piston and cylinder which cooperate to define a variable volume cylinder chamber, means for supplying hydraulic fluid under pressure to said cylinder chamber to effect relative movement between said piston and cylinder and an increase in the volume of said variable volume cylinder chamber, conduit means connected in fluid communication with said variable volume cylinder chamber for conducting hydraulic fluid from said variable cylinder chamber to effect a decrease in the volume of said variable volume cylinder chamber, valve means connected in fluid communication with said conduit means for at least partially controlling the flow of hydraulic fluid from said variable volume cylinder chamber, said valve means including a housing which at least partially defines a valve chamber having a hydraulic fluid inlet connected in fluid communication with said cylinder chamber by said conduit means and a hydraulic fluid outlet, a valve member disposed in said housing and movable between a closed position blocking hydraulic fluid flow from said hydraulic fluid inlet to said hydraulic fluid outlet to thereby block hydraulic fluid flow from said cylinder chamber and an open position enabling hydraulic fluid to flow from said hydraulic fluid inlet to said hydraulic fluid outlet to thereby enable hydraulic fluid to flow from said cylinder chamber, said valve means including a rigid sintered metal member disposed in said valve chamber and defining a plurality of small porous openings through which hydraulic fluid must pass in flowing from said hydraulic fluid inlet to said hydraulic fluid outlet, said valve member being formed by an imperforate sheet of resiliently flexible material having a major side surface, said major side surface of said sheet being disposed in abutting engagement with said rigid sintered metal member and extending across said plurality of openings to block fluid flow through said openings when said valve member is in the closed position, said sheet being resiliently deflected from the closed position to the open position in which at least a portion of said major side surface is spaced apart from said rigid sintered metal member to enable hydraulic fluid to flow through said plurality of openings when said valve member is in the open position, variable volume chamber means for holding fluid under pressure, said valve member being urged toward the closed position in engagement with said rigid sintered metal member under the influence of the fluid pressure in said variable volume chamber means, said valve member being movable from the closed position to the open position under the influence of the pressure of hydraulic fluid in said valve chamber and against the influence of the fluid pressure in said variable volume chamber means when the hydraulic fluid pressure in said cylinder chamber exceeds a predetermined pressure to effect at least partial relieving of the hydraulic fluid pressure in said cylinder chamber, said valve member being effective upon movement from the closed position to the open position to effect a reduction in the volume of said variable volume chamber means.

28. A system as set forth in claim 27 wherein said sheet and said rigid sintered metal member both have a generally cylindrical configuration, said major side surface of said sheet being disposed in engagement with a radially outer side of said rigid sintered metal member when said valve member is in the closed position.

29. A system as set forth in claim 27 wherein said sheet and said rigid sintered metal member both have a generally cylindrical configuration, said major side surface of said sheet being disposed in engagement with a radially inner side of said rigid sintered metal member when said valve member is in the closed position.

30. A system as set forth in claim 27 wherein said sheet has a circular disc shaped configuration.

* * * * *